J. GÖHRING.
WHEELED VEHICLE.
APPLICATION FILED MAR. 26, 1910.
989,841.
Patented Apr. 18, 1911.
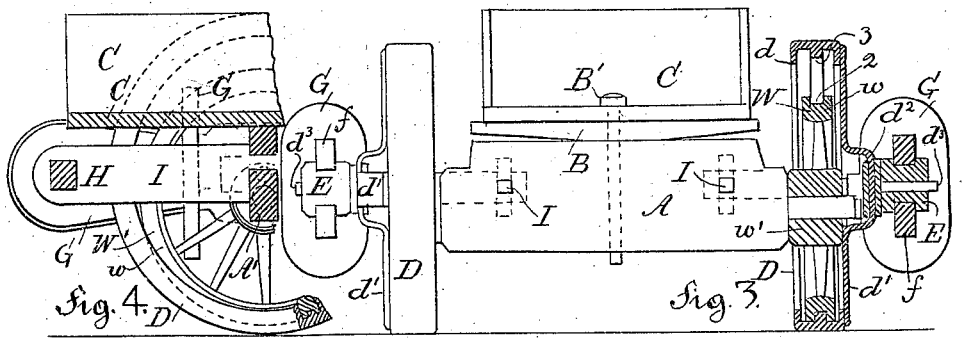
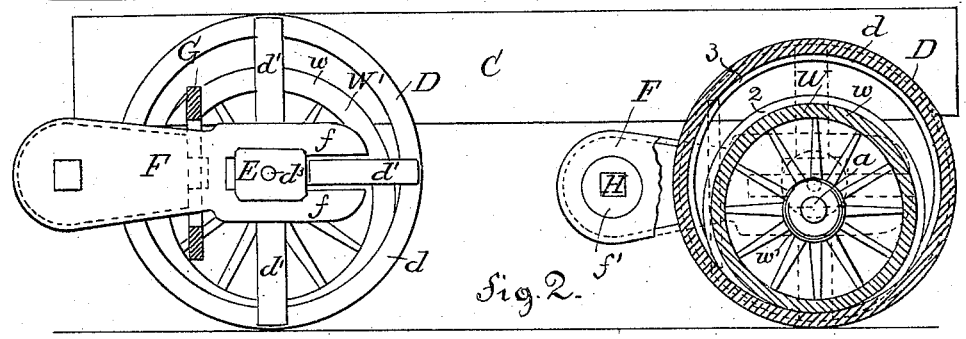
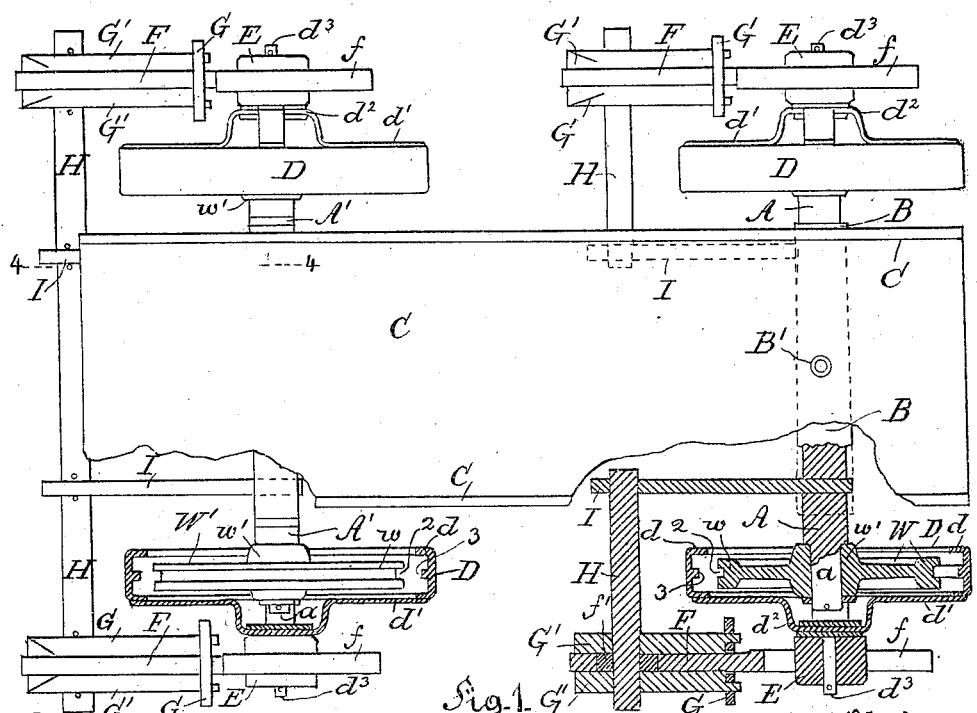
Witnesses:
Edith Healey
May Healey.
Jakob Göhring
Inventor
by A. & B. Harvey
his Attorneys

UNITED STATES PATENT OFFICE.

JAKOB GÖHRING, OF WAINWRIGHT, ALBERTA, CANADA.

WHEELED VEHICLE.

989,841.

Specification of Letters Patent. Patented Apr. 18, 1911.

Application filed March 26, 1910. Serial No. 551,803.

*To all whom it may concern:*

Be it known that I, JAKOB GÖHRING, residing at Wainwright, Province of Alberta, and Dominion of Canada, have invented new and useful Improvements in Wheeled Vehicles, of which the following is a specification.

My invention which will be hereinafter fully set forth and claimed relates to wheeled road vehicles and especially to such that are intended to travel upon soft ground.

The object of my invention is a device providing an automatically movable track upon which the wheels of the vehicle travel. I attain this object by means of an auxiliary wheel, or, more strictly speaking, of a wheel rim, with broad faces and independent gear and rotation, within which the vehicle wheel rotates, traveling on the internal surface of said rim.

Figure 1, is a plan of a wagon fitted with my device, parts being in section to show the construction. Fig. 2, is an elevation of the same, also having parts in section. Fig. 3, is a front elevation of the same, also having parts in section and Fig. 4, is a section on line 4—4, Fig. 1.

A is the front axle tree, A¹, the rear axle tree. B the bolster, B¹ the king bolt and C the box of an ordinary wagon; the pole is not shown, nor a reach for which latter the wagon box C is doing service.

W W are the front wheels and W¹ W¹ the rear wheels. They are of the ordinary construction, except that the wheel rims $w$, or tires have a central groove, 2, and their hubs, $w^1$, are mounted on the axles in the ordinary way, $a$ being the axle pins or journals.

D are broad wheel rims, of greater diameter than the wheels W W¹, having inner side-flanges, $d$, and a central tongue or ridge, 3, adapted to engage the groove 2 in the wheel rim. These rims are broad and the space between the flanges $d$ is wider than the rim of the wheels W and W¹, as shown in Figs. 1 and 3.

Arms, $d^1$, on one side, the outer face, of the rim, carry a hub-like construction, $d^2$, some distance from the face of the wheel hub $w^1$ (so as to leave play between them) and to this rim-hub $d^2$ is secured a stud $d^3$, acting as an axle pin. Each of these axle pins, $d^3$, is journaled in a block, E, having its top and bottom grooved longitudinally (see Fig. 3). This block is carried in a forked arm, F, disposed longitudinally, the tines, $f$, of which engage the grooves in the block and allow the latter a longitudinal movement. The arm F is carried at its rear end upon a square-sectioned bar, H, secured by arms, I, parallel to the axle tree. As this arm F must have freedom to oscillate, it is mounted upon said bar by a square-eyed circular bush, $f^1$. Said arm passes through a yoke, G, which is slotted to allow vertical oscillating movement to said arm, as shown in Fig. 2.

The yoke G is carried by two arms G¹ G¹, one on each side of the arm F, mortised into said yoke and mounted at the other end upon the square bar H.

At the rear axle the bar H is in one piece, running through from one side to the other and carrying the arms F and G¹ at each end, but at the front axle the bar H is in two lengths, so as to allow a medial gap for a reach and the like. The arms I are rigidly secured to the axles, holding the bar H rigidly against sagging and torsionally. It will be observed that the arms I, bars H and arms F and G¹ with yokes G and blocks E form the support of the auxiliary wheels D, which, with their axle pins $d^3$, rotate in the blocks E. The yokes G are held rigidly by the arms G¹ on the bars H, while the hub of the arm F is allowed to turn on the square bar (by the bush $f^1$) and the forked ends $f$ are free to move vertically, their movement being limited by the slot in the yoke G. Again, the auxiliary wheels D have a certain amount of longitudinal freedom, as the block E may slide in the forks of the arms F. They are mere shells and carry no part of the weight of the wagon. The road wheels W and W¹ are never in contact with the ground or road surface, but move on the inner surface of the rims of the auxiliary wheels, as on a track, while the exterior broad surface of the latter is in contact with the ground or road surface. As the wheels W and W¹ rotate, they rotate the auxiliary wheels D, thus continually putting down new track in front of them and taking it up at the rear and providing a smooth surface (the inner face of the rim D) for its travel.

I claim as my invention:

1. In a wheeled vehicle, the combination with the axles and wheels, of longitudinal arms projecting rearwardly and secured rigidly to the axles, a transverse bar parallel to each axle and carried rigidly by said arms, a pair of arms held torsionally on the outer ends of said bars, outside of the wheels and projecting forwardly, a slotted yoke carried by said arms, an arm between each pair of said yoke arms mounted rotatively on said transverse bar and passing through the slot of said yoke and having a forked end, a block grooved to receive the tines of said fork slidingly, an axle pin journaled in said block, an auxiliary wheel of greater diameter and greater width than the road wheel and surrounding the latter and having spoke arms on the outside carrying said axle pins, substantially as set forth.

2. In a wheeled vehicle, the combination with the axles, of wheels journaled thereon and having grooved rims, wheel rims of greater diameter and greater width than the road wheels and having tongues or ridges fitting the grooves of the road wheels and having inner flanges, one of said rims surrounding each road wheel, spoke-like arms on the outer face of said rims carrying an axle pin, a block for each wheel in which said axle pin is journaled and means for carrying said blocks allowing it a limited longitudinal and vertical movement, substantially as set forth.

In testimony whereof I affix my signature, in presence of two subscribing witnesses.

JAKOB GÖHRING.

Witnesses:
C. B. MANNER,
S. G. LEWIS.